July 4, 1933.    F. W. GAY    1,916,926
ARCING GROUND SUPPRESSOR
Filed Dec. 11, 1930    2 Sheets-Sheet 1
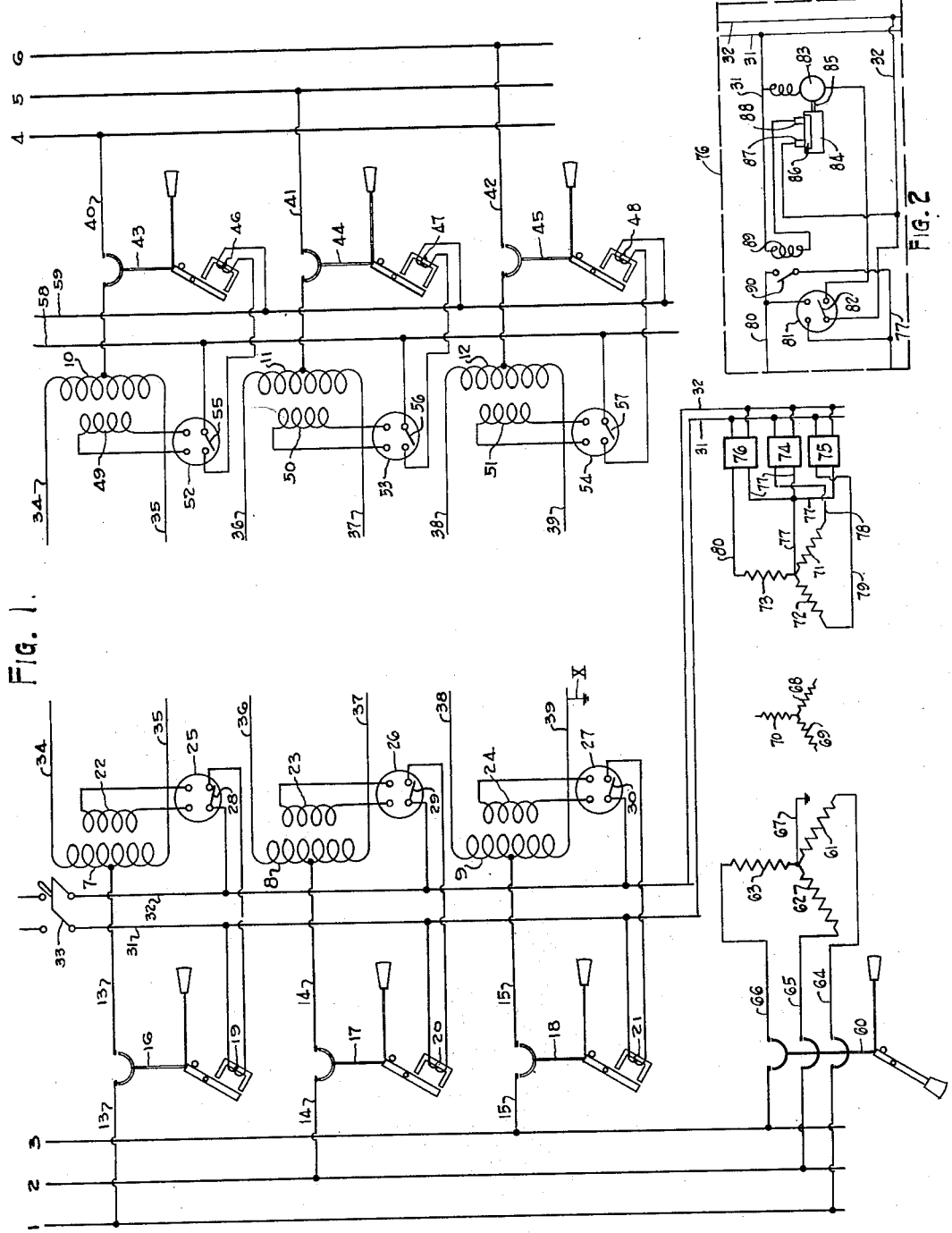
INVENTOR
Frazer W. Gay July 4, 1933. F. W. GAY 1,916,926
ARCING GROUND SUPPRESSOR
Filed Dec. 11, 1930 2 Sheets-Sheet 2

INVENTOR
Frazer W. Gay

Patented July 4, 1933

1,916,926

UNITED STATES PATENT OFFICE

FRAZER W. GAY, OF NEWARK, NEW JERSEY

ARCING GROUND SUPPRESSOR

Application filed December 11, 1930. Serial No. 501,608.

This invention relates to a novel transmission system having inherently a higher transmission capacity and a greater reliability of operation than systems commonly used heretofore, and in addition a system having its instantaneous fault to ground current limited to any desired value as fully explained in my Patent No. 1,752,666 and in addition having its fault to ground current substantially suppressed within a few cycles after the fault occurs.

It is an object of this invention to assist a transmission line to clear faults that are not of a serious nature without interrupting the circuit.

It is a further object of this invention to bring the solidly grounded point of a three phase high voltage transmission system to the potential of that phase which is grounded for an instant following the grounding of said phase in order to allow the grounding arc to clear up.

It is a further object of this invention to provide a low reactance per circuit on a transmission line.

It is a further object of this invention to provide a novel relay system capable of selecting a phase circuit that is in trouble.

It is a further object of this invention to substantially instantaneously clear a phase of a transmission line that is in serious trouble.

I propose to carry twin conductors in each phase of each transmission line and to insulate from each other each conductor in such twin pair of conductors. It is well known that a major part of the reactance voltage built up in a single phase conductor is produced by flux interlinkages that occur within a few inches of the conductor and that if the diameter of the conductor is considerably increased as by the use of aluminum instead of copper, a substantial reduction in impedance occurs even if the resistance of the conductor is not materially altered. By using a plurality of conductors in each phase of a transmission line and by spacing each of the conductors far apart with respect to any other conductor, I greatly increase the reluctance acting against magnetism linking such conductors and hence greatly reduce the reactance. Now it is well known that the capacity of a long high voltage transmission line having conductors of large cross section is limited by the reactance of the line rather than by its resistance. I find that by using two conductors per phase insulated from each other and spaced apart several feet as I propose, I can increase the capacity of such a high voltage three phase transmission line from 30 to 40%. Many power companies will find that the construction I suggest may profitably be used by reason of increased line capacity even if the many other advantages I obtain did not follow with very little additional expenditure.

Up to the present time only one method of substantially instantaneously selecting a faulty transmission line has proved even moderately reliable, simple, and cheap and this is the system using two parallel transmission lines and differential relays functioning on a difference in current between them. This system is reliable for faults near the center of the line but if the fault is near one end the current in each line is nearly equal and the relays at the remote end may not function until the breakers near the fault have opened and limited the fault current to a single line.

I propose to use mid tapped transformers shunted across each pair of twin conductors at both ends of the line and with a single conductor feed at the mid point of the auto transformer. A fault on one conductor of such a system will unbalance the currents and build up a voltage across the transformer. A secondary coil on the core will have induced in it a high voltage and will operate an inverse time load relay on the affected phase substantially instantaneously for great current unbalance. I propose in the preferred form to use a so called "hedge hog" transformer (having open magnetic circuit), so that the voltages induced will not reach a maximum except for a simultaneous failure of lines on different phase circuits.

I propose to connect all transformers feeding power to my novel transmission system so that they will perform as fully explained in my Patent No. 1,752,666 and a fault on one phase will cause a very limited amount of phase to ground current unbalance and a comparatively low induced voltage on the inverse time relay and hence a relatively long time of relay operation, while if a fault should occur simultaneously on separate phases the amount of unbalanced current would be limited only by the inherent impedance of the system to phase to phase current and would be so great that the inverse time load relays would function substantially instantaneously.

It is evident therefore that for a line to ground fault the line will in most cases be able to extinguish an arc caused by lightning or a switching serge before the relatively small unbalanced current causes the relay on the grounded line to operate to trip the line and before any insulator strings are damaged.

In addition to limiting the fault to ground current to a value which should clear up without assistance, I propose to add a low voltage winding on each phase of a main star-star connected transformer bank and connect a switch across each such winding with relays adapted to hold a short circuiting switch closed (for a fraction of a second) to short circuit that transformer phase winding connected to the faulty phase circuit. It is obvious that the short circuiting of this transformer will instantly bring the faulty line to substantially ground potential.

It is a further object of this invention to combine single phase switching with a thoroughly reliable means for selecting the individual phase conductors that are faulty.

It is important to note that most original three phase circuits were controlled by single pole circuit breakers, each functioning independently of the others.

This method of control was abandoned for two reasons.

1st. The more extensive use of three phase motors made it undesirable to leave the machines on single phase.

2nd. Where two or more three phase lines were in multiple, no relays were available to reliably select the faulty phase, although such relays were available to reliably select a faulty three phase line.

The use of a plurality of three phase circuits in multiple and the loading of such a plurality of multiple circuits to their stability limit makes it imperative to maintain a minimum reactance for such a plurality of three phase lines. The interrupting of all three phases of one such line enormously increases the reactance of a group of two or three lines and diminishes their ability to transmit power much more than the interrupting of only one phase of one such a line.

Referring to the drawings,

Figure 1 shows a three phase sending bus and a three phase receiving bus and one three phase connecting line with twin conductors and single phase switching.

Figure 2 is a detail of one of the three phase arcing ground suppressors of Figure 1 i. e. No. 76.

Figure 3:
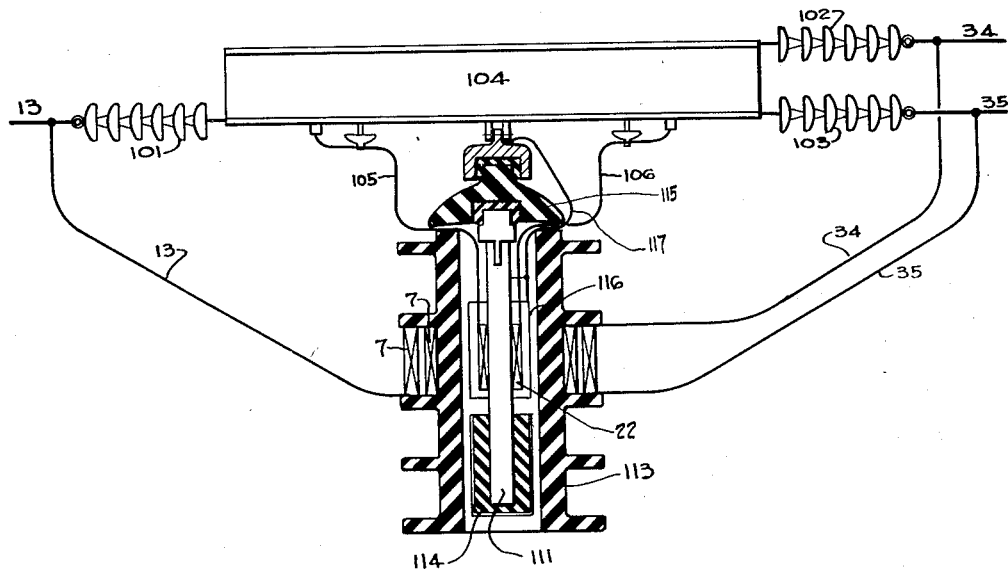
Figure 3 shows a detail of one of the auto transformers of Figure 1.

Figure 1 of the attached drawings shows a high voltage three phase station bus having conductors 1, 2, 3. This bus is connected to a three phase substation bus having conductors 4, 5, 6 by the novel three phase transmission system of the present invention. 7, 8, 9 are three auto transformers preferably suspended on a pole at the station end of the line. The mid points of the windings of these auto transformers 7, 8, 9 are connected by leads 13, 14, 15 to busses 1, 2, 3. Single pole circuit breakers 16, 17, 18 are connected in these leads 13, 14, 15 and are tripped by coils 19, 20, 21. Secondary coils 22, 23, 24 are in inductive relation to the primary coils 7, 8, 9 of the auto transformers at the station end. These auto transformer secondaries connect to relays 25, 26, 27. These relays 25, 26, 27 upon operation close switches 28, 29, 30. Switches 28, 29, 30 connect trip coils 19, 20, 21 respectively to D. C. trip circuit 31, 32. This D. C. trip circuit is energized by closing switch 33.

Auto transformers 10, 11, 12 similar to 7, 8, 9 are preferably suspended on a pole at the substation end of the line. The mid points of these auto transformers are connected to the substation bus 4, 5, 6 by conductors 40, 41, and 42 through single phase circuit breakers 43, 44, 45. These circuit breakers are operated by trip coils 46, 47, 48. Secondary windings 49, 50, 51 are wound in inductive relation to the auto transformer coils 10, 11, 12 and are connected respectively to the relays 52, 53, 54. These relays 52, 53, 54 on operation close respectively switches 55, 56, 57. Switches 55, 56, 57 upon closing connect trip coils 46, 47, 48 to D. C. trip circuits 58, 59. The end terminals of the auto-transformer 7 at the station end are connected to the end terminals of auto transformer winding 10 at the substation end by transmission conductors 34 and 35 of one phase. Similar conductors 36 and 37 connect the end terminals of transformers 8 and 11 to form the second phase and similar conductors 38 and 39 connect the end terminals of transformers 9 and 12 to form the third phase of the transmission. The station bus 1, 2, 3 receives its power from transformer windings 61, 62, 63 through leads 64, 65, 66 connecting to the bus through circuit breaker 60. The neutral of the transformer windings 61, 62, 63 is connected to ground by lead 67. Generated power is fed to the transformer primaries 68, 69, 70. Low voltage tertiary windings 71, 72, 73 are connected to short circuiting devices 74, 75, 76 by neutral lead 77 and main leads 78, 79, and 80.

Figure 2 shows one of the short circuiting devices (76 of Figure 1) connected across the winding 73 by neutral leads 77 and winding lead 80. This short circuiting device or arcing ground suppressor 76 is similar to short circuiting devices 74 and 75. A relay 81 has its operating coil connected across winding 73 by neutral lead 77 and phase lead 80. This relay 81 upon operating closes switch 82. Switch 82 connects motor 83 across the D. C. circuit 31, 32. Motor 83 drives a drum 84 through shaft 85. This drum 84 carries a conducting member 86 which bridges brushes 87 and 88 and energizes contactor coil 89 from D. C. circuit 31, 32. The energizing of coil 89 closes switch 90. Switch 90 short circuits winding 73 and the voltage therefore of inductively connected windings 63, 70, and 73 substantially vanishes and conductor 3 is brought to substantially the same potential as ground lead 67.

Figure 3 shows an elevation partly in section of the auto transformer primary 7 of Figure 1. This auto transformer is attached to a support 104 at the top of transmission line tower at the sending end. The conductor 13 is attached to the tower support 104 by means of an insulator string 101 and the transmission cables 34 and 35 are attached to the support 104 by insulators 102 and 103. The primary winding 7 is wound with one half its turns in each of two concentric coils 7, 7. The mid point is connected to lead 13 and the ends of the winding to transmission cables 34 and 35. Coils 7, 7 are mounted on a porcelain insulator 113 which is attached to insulator 115, which in turn is attached to the steel support 104. A magnetic core 111 is mounted inside porcelain insulator 113 and on this magnetic core is wound the secondary coil 22. An electrostatic shield 116 is wrapped around coil 22. This shield as well as core 111 is grounded by lead 117 to the tower support 104. Additional insulation 114 is supplied between the grounding shield 116 and the porcelain 113.

Figure 4:
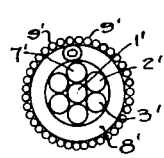
Figures 4 and 5 show a cross section and longitudinal section of a conductor used in Figure 1.
Figure 5:
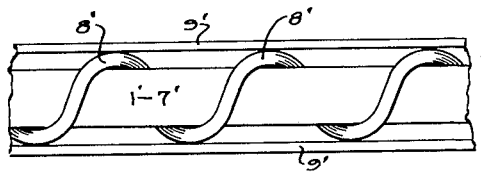

Figure 4 shows a conductor of the present invention in cross section and Figure 5 shows a longitudinal cross section of the same preferred conductor. Steel wires 1' to 7' constitute the center core which acts as a messenger cable. Around this messenger cable a metal wire or tube 8' is wound spirally. Outside of this metal tube the aluminum conductor wires 9' are wound in a counter spiral. It is obvious that no special arrangement of wires is necessary for the successful operation of this transmission scheme but cables having a large conducting diameter are desirable.

Figure 6:
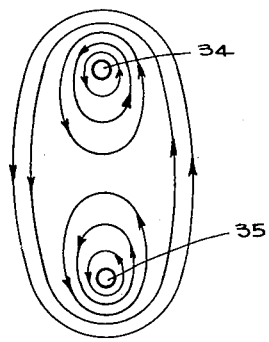
Figure 6 is a diagrammatic cross section of the twin conductors in one phase of Figure 1 made to illustrate the increased reluctance to interlinking flux of the divided conductor.

Figure 6 shows a cross section of the two conductors 34 and 35 and it will be seen at once that the magnetic reactance flux interlinking a single conductor and hence meeting low reluctance embraces only one half the current, while that magnetic flux which interlinks the total current and therefore is subject to double the M. M. F. is opposed by the reluctance of a long flux path.

The operation of this device is as follows. If a fault develops on any conductor as at X, say on conductor 39 (say conductor 39 is grounded as by a lightning flash). The grounding of conductor 39 effectively grounds station bus 3, transformer lead 66, and short circuits high voltage winding 63. The other two high voltage windings 61 and 62 carry the load in open delta, as fully explained in my Patent No. 1,752,666. The high magnetizing current of the open delta transformer, as well as any additional ground current that may be caused to flow, as fully explained in my Patent No. 1,752,666 will pass to the ground through the fault at X and over leads 15 and 39. This current will pass only through the bottom half of auto transformer windings 9. The core of transformer 9 will be magnetized and a voltage will be induced in secondary winding 24. This will cause relay 27 to move its contacts at a slow rate of speed. Relays 25 to 27 and 52 to 54 are of the inverse time element type which, as is well known to those skilled in the art, are operated by induced currents and are damped by a permanent magnet, thereby resulting in slow operation of these relays on the occurrence of small overloads.

Immediately upon the occurrence of the fault at X and the consequent short circuiting of transformer windings 63, 70, and 73 device 76 will proceed to operate. Device 76 is shown in detail in Figure 2. A relay 81 (Figure 2) has a holding coil shunted across leads 77 and 80 that is across winding 73. Immediately upon failure of voltage of winding 73, relay 81 allows switch 82 to close. This places motor 83 across the D. C. circuit 31, 32. Motor 83 revolves drum 84 through shaft 85. Contact 86 bridges brushes 87 and 88 and places coil 89 across D. C. circuit 31, 32. Coil 89 thereupon closes contactor 90 and contactor 90 places a short circuit across tertiary winding 73. The short-circuiting of winding 73 acts also to short-circuit windings 70 and 63, thereby reducing the voltage across the fault at X to substantially zero value so that the current at this fault also reduces to zero. The magnetizing current for windings 68 and 69 are now fed through winding 70 and a current corresponding to that in winding 70 is induced in the short-circuited winding 73. The fault X and the ground wire 67 are now brought to substantially the same voltage so that the ground wire 67 accepts the charging current of the line. The fault at X will clear up (unless line 39 is solidly grounded) while contactor 90 is closed i. e. during the time that the contact 86 on drum 84 is bridging brushes 87 and 88.

After the fault at X clears up, voltage will appear across windings 63, 70, and 73 the moment coil 89 is open circuited and in consequence contactor 90 opens the short circuit across winding 73. Relay 81 will open switch 82 almost the instant that voltage appears on wires 77 and 80. Motor 83 is highly damped and will stop almost instantly after contact 86 leaves brushes 87 and 88. Equipment 76 is thus reset and ready for another fault. If the fault at X is not removed by the operation of apparatus 76, switch 82 will remain closed and motor 83 will continue to rotate and contactor 90 will pump until relay 27 operates. Relay 27 may be set to operate after contactor 90 opens the first time and before it closes the second time, so that switch 90 will not pump. Obviously if the closing of contactor 90 removes the fault at X, relay 27 will slowly reset and breaker 18 will not trip.

On the other hand, if a simultaneous fault occurs on any other line in a different phase, the current passing through fault X will be many times as great as for a simple ground at X, so that relay 27 will trip breaker 18 almost instantly and before contactor 90 can operate the first time.

As many changes could be made in the above construction and many apparently widely different embodiments of this invention could be made without departing from the scope thereof, it is intended that all matter contained in the above descripion or shown in the accompanying drawings shall be interpreted as illustrative and not in a limiting sense.

What is claimed is:

1. In combination in a three phase transmission system fed by a transformer winding having a solidly grounded neutral, a switch arranged on closing to bring one phase of said transmission system to ground potential during a predetermined short interval of time, a conductor connected to said phase through circuit interrupting means, relay means cooperating with said switch and arranged upon the occurrence of a ground on said conductor to maintain said switch in a closed position during a predetermined period of time and relay means operating upon the occurrence of said ground and adapted to cause the tripping of said circuit interrupting means following the expiration of said predetermined period of time.

2. In combination, in a transmission system, a three phase sending bus, a three phase receiving bus, three-mid-tapped auto transformers adjacent said sending bus, three mid-tapped auto transformers adjacent said receiving bus, each of said auto transformers adjacent said sending bus having its mid-tap connected to a respective one of the phases of said sending bus and each of said auto transformers adjacent said receiving bus having its mid-tap connected to a respective one of the phases of said receiving bus, a plurality of line conductors arranged in pairs, each pair of line conductors having one of their terminals connected to the ends of a respective one of said auto transformers adjacent the sending bus and the other of their terminals connected to the ends of a respective one of said auto transformers adjacent the receiving bus, single pole circuit breakers included respectively in the connection between each of said sending bus transformers and the sending bus and in the connection between each of the receiving bus transformers and the receiving bus, and means arranged upon the occurrence of a fault on one conductor of a pair of transmission line conductors to effect the tripping of the circuit breakers in circuit with said faulty conductor.

3. In combination, in a three phase transmission system, a three phase transformer bank with a star connected high voltage winding having three phase windings and a solidly grounded neutral, means adapted upon the grounding of one phase line of said transmission system to limit the fault to ground current to a predetermined relatively small value, three low voltage tertiary windings, each of said low voltage tertiary windings being inductively associated with a respective phase winding of said high voltage transformer winding, and switch means connected to short-circuit one of said low voltage tertiary windings upon the grounding of the phase line connected to its inductively associated high voltage transformer phase winding.

4. In combination, in a three phase transmission system, a three phase transformer bank with a star connected high voltage winding having three phase windings and a solidly grounded neutral, said transformer bank high voltage winding being connected to said transmission system and arranged to operate open delta upon the short-circuiting of one of its phase windings, a short-circuiting device connected across the terminals of one of the phases of said transmission system and operable upon closing to short-circuit said phase, and a relay operable upon the reduction of voltage on said phase to cause the operation of said short-circuiting device.

5. In combination, in a three phase transmission system, a three phase transformer bank with a star connected high voltage winding having three phase windings and a solidly grounded neutral, said high voltage winding being connected to said transmission system and arranged to operate open delta upon the short-circuiting of one of its phase windings, a short-circuiting device connected across the terminals of one of the phases of said transmission system and operable upon closing to short-circuit said phase, a relay operable upon the reduction of voltage on said phase to momentarily cause the operation of said short-circuiting device, and switch means arranged to disconnect the grounded phase line after said ground is maintained on said line longer than a predetermined interval.

In testimony whereof, that I claim the invention set forth above I have hereunto set my hand this 10th day of December, 1931.

FRAZER W. GAY.